Aug. 13, 1946. T. MILLER 2,405,663
MECHANISM FOR GUIDING MULTIPLE TOOLS
Filed Sept. 13, 1944 3 Sheets-Sheet 1
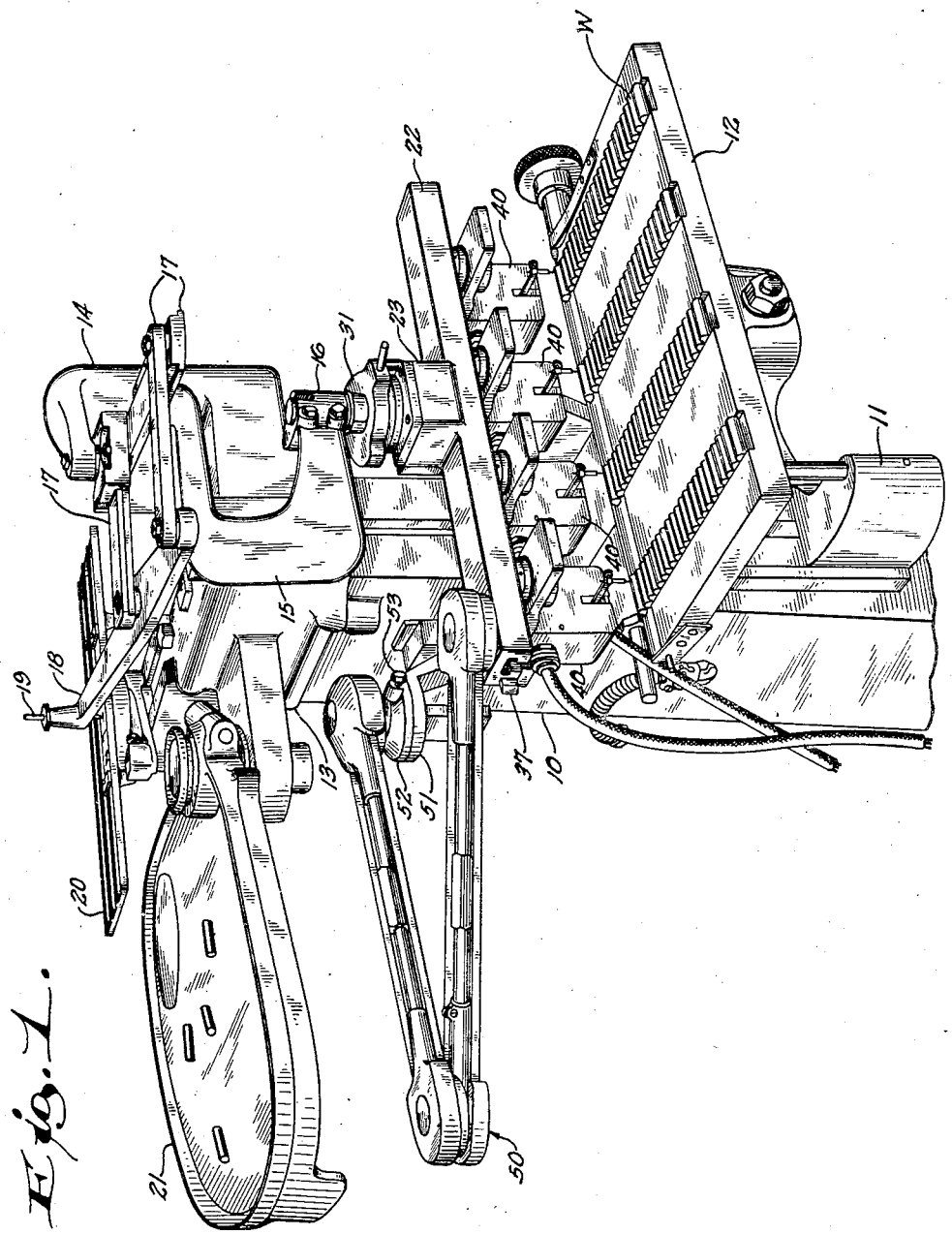
INVENTOR
THEODORE MILLER
BY John W. Michael
ATTORNEY.

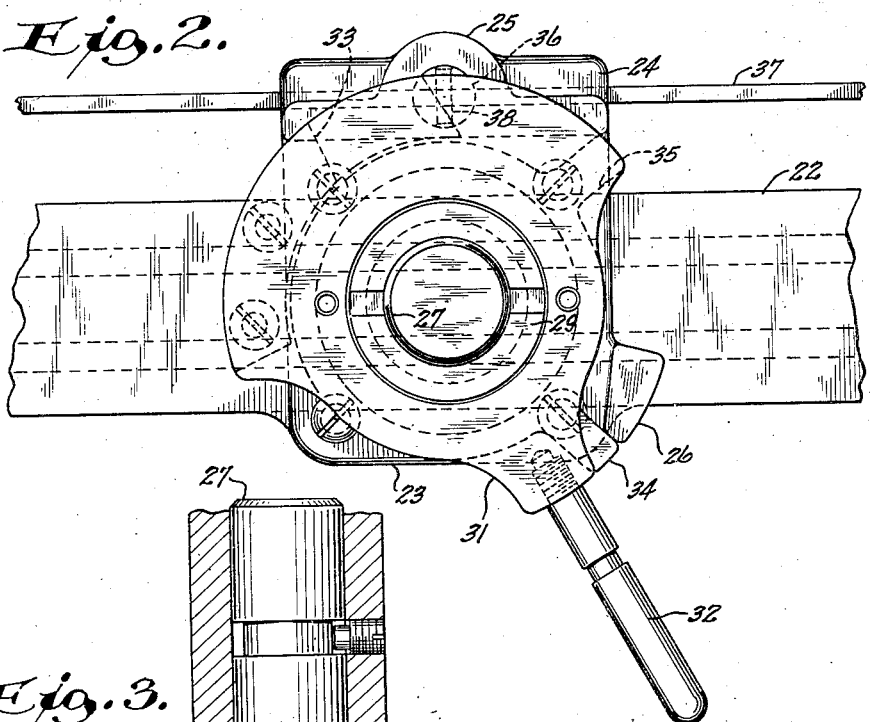
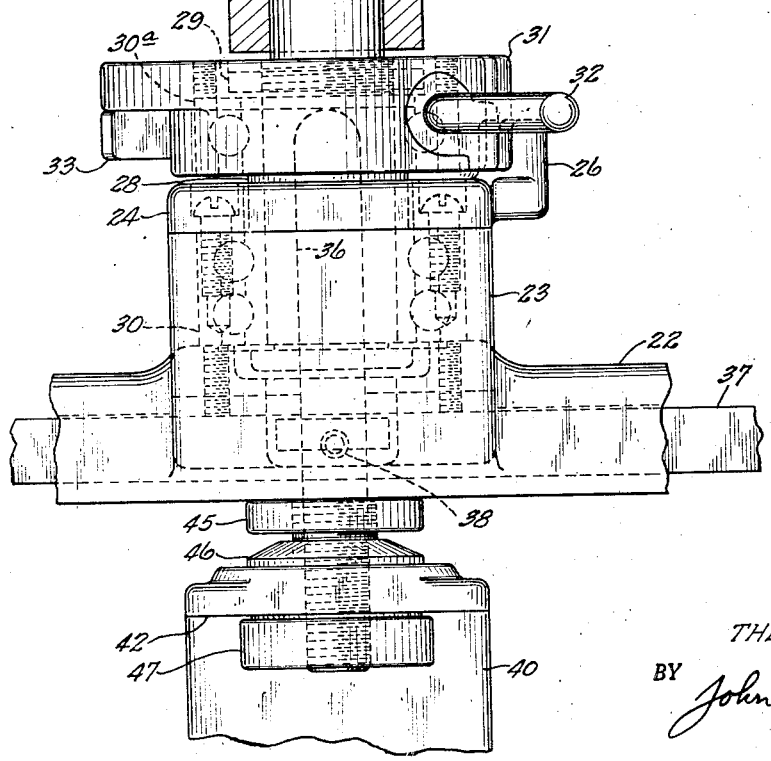

Aug. 13, 1946.    T. MILLER    2,405,663
MECHANISM FOR GUIDING MULTIPLE TOOLS
Filed Sept. 13, 1944    3 Sheets-Sheet 3

INVENTOR.
THEODORE MILLER
BY John W. Michael
ATTORNEY.

Patented Aug. 13, 1946

2,405,663

UNITED STATES PATENT OFFICE 2,405,663

MECHANISM FOR GUIDING MULTIPLE TOOLS

Theodore Miller, Racine, Wis., assignor to George Gorton Machine Co., Racine, Wis., a corporation of Wisconsin Application September 13, 1944, Serial No. 553,821

6 Claims. (Cl. 219—15)

This invention relates to a mechanism for carrying and simultaneously guiding a plurality of etching tools, cutters, or other metal removing or working instruments and is particularly adaptable for use with a pantograph or other type machine where a cutter head has universal lateral movement relative to the work support.

One of the objects of the invention is to provide means for holding a multiplicity of metal removing or working instruments so that they may be jointly guided by a single template or pattern and simultaneously make a plurality of identical designs in the work.

Another object of the invention is to provide a simple and economically manufactured rail for holding a multiplicity of metal removing or working instruments which rail can be mounted on a pantograph machine to effect a joint guiding of said instruments by the machine.

The foregoing objects are obtained by providing a rail which is pivotally mounted to the cutter head of the pantograph machine, locking a multiplicity of tools or metal removing or working instruments to the rail so that they are jointly guided thereby, and providing a parallel relationship maintaining mechanism operable between the rail and the body of the pantograph machine. As the cutter head of the pantograph machine is moved under the direction of the template or pattern and stylus or tracer, the pivotal mounting of the rail will be likewise moved. By always keeping the rail parallel to a fixed plane, every tool or instrument carried by the rail will also be moved in duplicate paths with that of the cutter head thus making a plurality of identical cuts or marks in the work.

With the foregoing and other objects in view, developed by the following description, the invention consists in certain novel advantageous structural organizations and features, as well as combinations and sub-combinations, as more fully explained hereinafter and specified by the following claims.

Referring to the accompanying drawings forming a part hereof,

Figure 1 is a perspective view of a pantograph machine having the invention adapted thereto;

Figure 2 is a fragmentary, greatly enlarged top plan view of the mounting mechanism of the instrument carrying rail comprising an element of the invention;

Figure 3 is a fragmentary, greatly enlarged view in front elevation of the mounting mechanism viewed in Figure 2;

Figure 4:
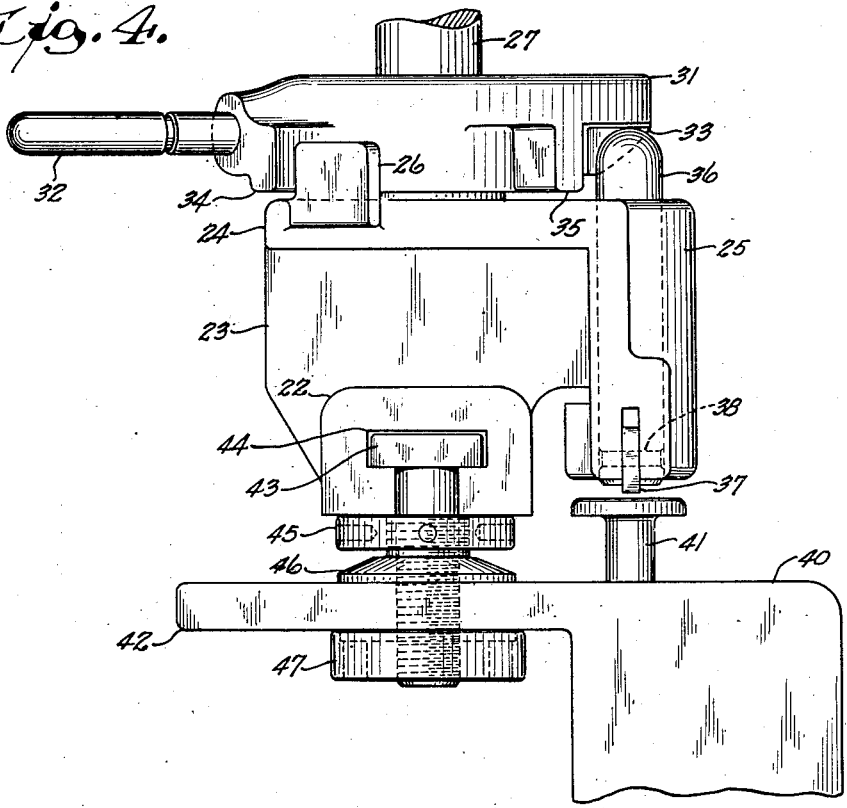
Figure 4 is a fragmentary, greatly enlarged view in side elevation of the mounting mechanism viewed in Figure 3.
Figure 5:
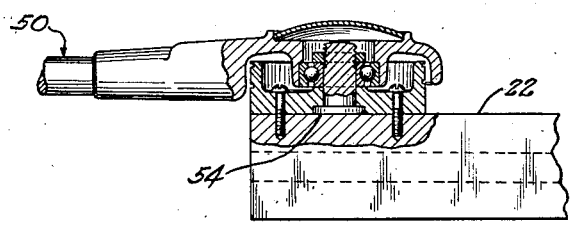
Figure 5 is a fragmentary sectional view of the method of securing the parallel relationship maintaining mechanism to the rail.
Figure 6:
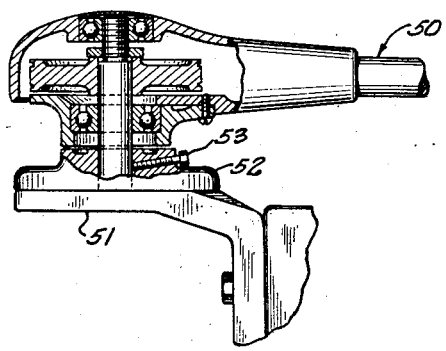
Figure 6 is a fragmentary sectional view of the method of securing the parallel relationship maintaining mechanism to the column of the pantograph machine.

Without intending to so limit the adaptability of the instant invention, and merely as an example, the invention is shown adapted to a commercial type of pantograph machine and employing four electric arc etchers of the type disclosed in U. S. Patent No. 2,337,341, issued December 21, 1943, on the application of Theodore Miller and Fred Christian Knapp. For instance, the invention could be as well adapted to any duplicating machines wherein the cutter head is movable, and in place of electric arc etchers, there may be utilized rotatable cutters driven by individual motors suspended on the rail or by a belt drive in the manner now standard practice with pantograph engravers employing single cutters.

Referring in greater detail to the drawings, there is illustrated a commercial type of pantograph machine having a supporting column 10 which adjustably carries a knee 11 for supporting the work table 12. Various types of work may be placed upon the table. There is shown for example bearing pins, fed from a magazine to an indexable rotating positioner for the purposes of positioning and holding the pins in proper relation relative to the etcher electrode during the etching operation.

The column 10 supports at its top a pantograph head 13. This head has integrally formed thereon a pantograph arm support 14. Pivoted to the head 13 is a cutter head 15 operated by the action of the pantograph levers 17, as is commonly known to those skilled in the art. The cutter head carries a spindle housing 16 in which may be secured the cutter or other metal removing instrument. One of the pantograph levers is extended to form a tracer arm 18 which carries at its end a stylus 19. Also supported on the pantograph head 13 is a copy table or template holder 20. The table 20 holds the template with which the stylus engages to direct the movement of the cutter head. As is common practice with these types of machines, the pantograph mechanism is adjustable so that the movement of the cutter head may be considerably reduced below the movement of the stylus. A tool tray 21 is also swingably carried on the pantograph head for convenience of the operator.

The operation of the machine thus described is substantially identical with that of several machines known to those skilled in the art and commercially available. As the tracer is moved over a template, the spindle housing 16 is also moved with respect to the work W. There are several ways of performing the cut or removing the metal from the work as the cutter head is moved. The common practice is to support a rotatable cutter in the cutter head which is operated by a flexible belt drive from a motor attached to the pantograph machine. It is also common practice to mount a single electric arc etcher in the cutter head. Such an etcher is identical to those heretofore mentioned as being disclosed in the U. S. Patent No. 2,337,341.

However, in order to incorporate a multiplicity of electric arc etchers, rotatable cutter or other metal removing instruments for simultaneous movement by the cutter head, there is employed an elongated rail 22. The rail 22 has a centrally located housing 23 on its upper surface. This housing contains the support for the bearings 30 by which the rail is pivotally mounted to the cutter head. A cover 24 for the housing has a rearwardly disposed bearing boss 25 containing an opening for slidably receiving a plunger 36. The cover 24 has an aperture therein sufficiently large to loosely receive a bearing spacer 28. This cover also has an upstanding stop 26 for limiting the movement of the cam holder 31. A shank or stud 27 provided with a head is inserted within the housing 23 with the head downmost and fitting in an enlarged portion formed in the bottom of the housing. A double row ball bearing 30 is inserted in the housing with its outer race engaging the inner walls of the housing and its inner race fitted on the shank 27. The cover 24 holds the bearing 30 in place within the housing and thus permits the rail to pivot about the shank 27. A bearing spacer 28 is positioned over the shank 27 and passes through the hole in the cover to rest against the inner race of the bearing 30. A single row ball bearing 30a has its inner race fitted on the shank 27 so as to seat on the spacer 28. A revolving cam holder 31 is carried by the outer race of the bearing 30a. The cam holder 31 with its bearing 30a, the spacer 28 and the bearing 30, together with the housing 23 and rail 22, are held in assembled relationship on the stud by a locking nut 29 positioned on a threaded portion of the stud 27. A portion of the stud 27 projects above the top of the cam holder 31 to provide a securing shank which is inserted in and secured to the spindle housing 16 in any suitable manner.

The revolving cam holder 31 has a laterally projecting finger 32 by which it may be rotated about the stud 27. It carries a cam 33 having a hardened surface arranged to engage with the top of a plunger 36 carried in the bearing boss 25. When the cam is rotated clockwise from the position shown in Figure 2, the cam bears downwardly on the upper end of the plunger 36 to cause it to move downwardly. The movement of the cam holder is arrested by stops 34 and 35 formed thereon abutting against stop 26. The plunger 36 carries a bar 37 which extends substantially over the entire length of the rail 22 and is secured to the bottom of the plunger 36 by a pin 38. The purpose of the bar 37 is to jointly operate the actuating buttons 41 of the electric arc etchers 40.

The electric arc etchers 40, as heretofore pointed out, are fully described in an issued U. S. patent, and description of them will not be made except to point out the manner in which they are secured to the rail 22. Each of the etchers 40 has a control button 41 which when depressed starts the actuation of the etching device. To secure the etchers in place on the rail 22, they are provided with forwardly extending fastening arms 42. The rail 22 has a longitudinal T-shaped slot 44 extending therethrough. Bolts 43 having squared heads are slid into the slot 44 with their shanks projecting downwardly. These bolts are locked in position at selected spaced intervals along the rail 22 by locking nuts 45. Back-up nuts 46 are positioned on the shanks of the bolts 43 below the locking nuts 45 and the fastening arm 42 then fitted on the shank of bolt 43 and held in place by locking nuts 47. In originally positioning the electric arc etchers 40, care must be taken to see that there is proper alinement of the electrode and the means for holding the various pieces of work on the work table.

As the cutter head is moved under control of the pantograph stylus, the rail 22 with its four electric arc etchers will be moved therewith. If it is maintained parallel to a fixed plane, the movement of the spindle housing 16 and shank 27 will be imparted simultaneously and identically to each of the electrodes of each electric arc etcher. To keep the bar parallel to a fixed plane, there is provided a parallel relationship maintaining mechanism designated generally at 50. This mechanism is commercially made and commonly known as a drafting machine. It is fully described in U. S. Patent No. 2,051,115, issued to Vard B. Wallace on August 18, 1936. Its details will not be further described here other than to indicate the manner in which it is secured to the column of the pantograph machine at one end and to the rail 22 at the other end. One end of the mechanism 50 is secured to a bracket 51 fastened on the side of column 10 by means of a plate 52 which has a set screw 53 therein. The shaft in this end of the mechanism is mounted in the plate 52 which in turn is securedly fixed to the bracket 51. The set screw 53 when tightened engages with the shaft of this end of the mechanism 50 to hold the drum contained therein in a selected position.

The other end of the mechanism 50 has its drum secured to the top of the rail 22 at the left hand end thereof and as viewed in the drawings. The drum in this instance carries a stud 54 which holds the bearing for this end of the mechanism 50. In order to adjust the rail 22, the set screw 53 is loosened and the rail pivoted about the supporting shank 27 until all of the electrodes of the electric arc etchers are in alinement with the work holding mechanism. When this position is attained, the set screw 53 is made secure. Thereafter the rail 22 whenever moved by the cutter head 16 will always be parallel to this original position.

In the operation of the device, the tracer is moved by the operator through the configuration of the pattern or template. At the commencement of this movement, the operator moves the revolving cam holder in a clockwise manner which lowers the bar 37 simultaneously depressing all of the buttons 41 of the electric arc etchers 40 causing the electrodes to simultaneously substantially commence etching the work with which they are in contact. When it is necessary to move to the next configuration in the pattern, the revolving cam holder is moved to the position shown in Figure 2 which permits elevation of the bar 37 and each of the buttons 41 to assume their non-operative position, raising the electrodes out of contact with the work. Thereupon the shift of the tracer finger to the next configuration can be made and the operation re-commenced.

Although only one embodiment of the invention is shown and described herein, it will be understood that this application is intended to cover such changes or modifications as come within the spirit of the invention or scope of the following claims.

I claim:

1. A machine for simultaneously making a multiple duplicate design comprising a frame, a universally laterally movable cutter head carried by said frame, a carrying rail pivotally mounted on said cutter head for movement thereby, parallel relationship maintaining mechanism operable between said frame and said rail to keep said rail parallel to a fixed plane as it is moved by said cutter head, and a plurality of metal working instruments secured to said bar and movable therewith.

2. An adapter for a pantograph machine having a universally laterally movable cutter head, comprising a rail having a pivotally mounted shank adapted to fit in and be secured to said cutter head, said rail being adapted to receive and hold a plurality of metal working instruments, and means cooperable between said rail and a fixed point to maintain said rail parallel to a fixed plane as it is moved by said cutter head.

3. A multiple design etching machine comprising a frame, a universally laterally movable head carried by said frame, a rail pivotally mounted on said head, means for maintaining said rail parallel to a fixed plane as it is moved by said head, and a plurality of electric arc etchers carried by said rail.

4. A multiple design etching machine comprising a frame, a movable head carried by said frame, a rail pivotally mounted on said head, means for maintaining said rail parallel to a fixed plane as it is moved by said head, a plurality of electric arc etchers carried by said rail, said etchers each having control buttons, and a bar and plunger device mounted on said rail, said bar being positioned to contact said buttons, said plunger being reciprocal to cause said bar to simultaneously operate said control buttons.

5. A multiple design etching machine comprising a frame, a movable head carried by said frame, a rail pivotally mounted on said head, means for maintaining said rail parallel to a fixed plane as it is moved by said head, a plurality of electric arc etchers carried by said rail, said etchers each having control buttons, a bar and plunger device on said rail and operable to simultaneously operate said control buttons, and a revolving cam for operating said plunger.

6. In a pantograph machine, a base member, a universally laterally movable cutter head, a rail pivotally carried by said cutter head and movable thereby, a parallel relationship maintaining device having one end adjustably carried by said base member and the other end secured to said rail whereby said rail may be set to move parallel to a fixed plane the position of which is determined by adjustment of said first-mentioned end, a multiplicity of metal working instruments carried by said rail, and a work table for carrying work in operative relation to said instruments.

THEODORE MILLER.